Feb. 4, 1969  R. E. BRUCE  3,425,717
TUBE COUPLING ASSEMBLY
Filed Feb. 14, 1966  Sheet 1 of 2
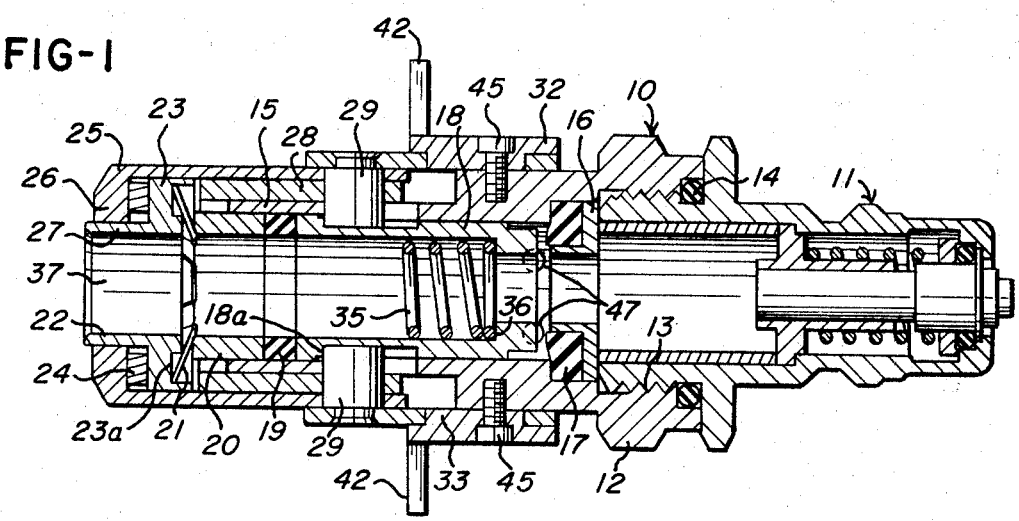
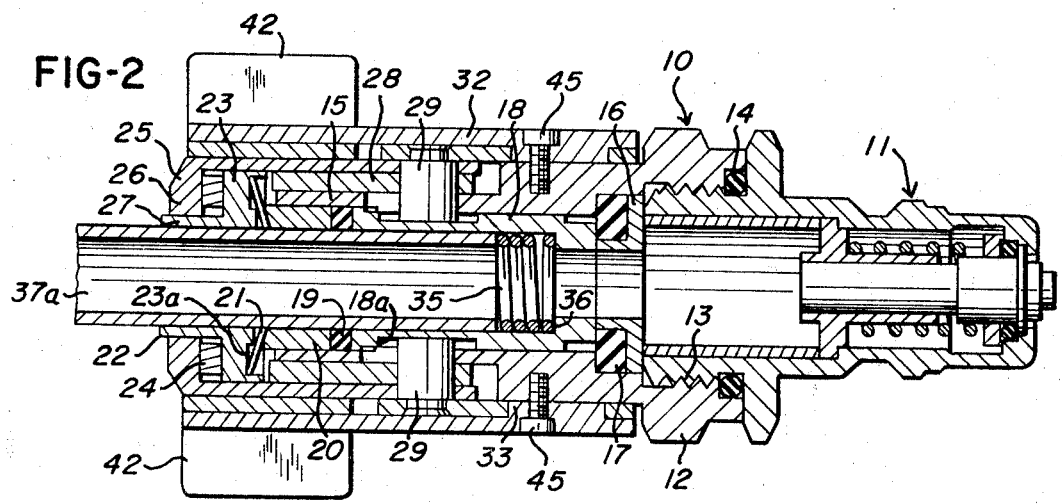
INVENTOR.
RALPH E. BRUCE
BY Norman R. Wissinger
ATTORNEY

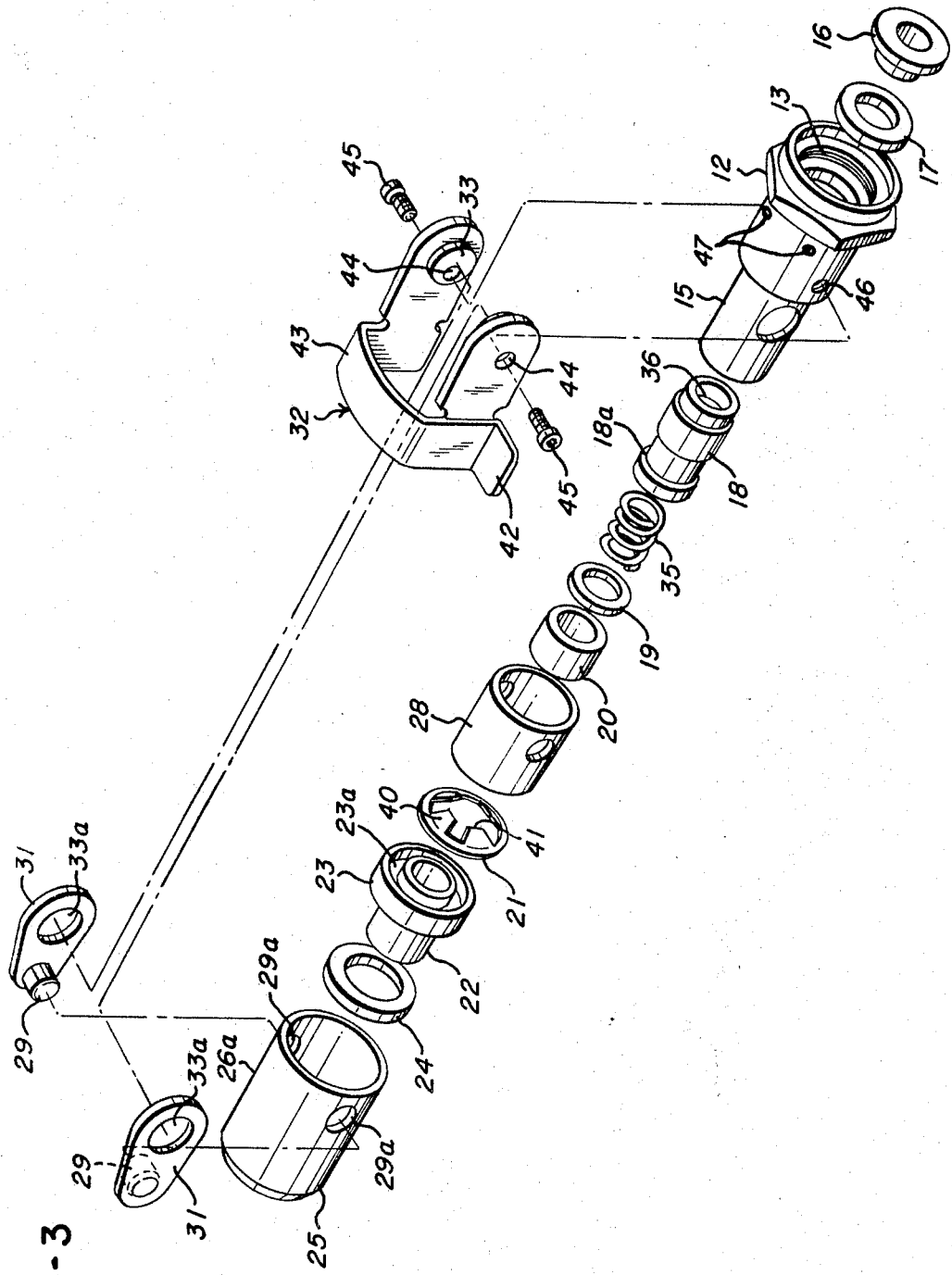

United States Patent Office 3,425,717
Patented Feb. 4, 1969

3,425,717
TUBE COUPLING ASSEMBLY
Ralph E. Bruce, Dayton, Ohio, assignor to Production Control Units, Inc., Dayton, Ohio, a corporation of Ohio
Filed Feb. 14, 1966, Ser. No. 527,115
U.S. Cl. 285—153            5 Claims
Int. Cl. F16l 19/06, 37/18

ABSTRACT OF THE DISCLOSURE

A tube coupling device for quickly joining and disconnecting bare tube ends comprising a hollow coupler body with axially slidable components therein providing a socket in which the bare or plain tube end may be inserted and then mechanically locked and sealed upon the forcing together of the slidable components and single means such as an eccentric bail and toggle linkage exteriorly of the coupler body for forcing the slidable components therewithin together.

---

The present invention relates to a tube coupling assembly and particularly to a quick-acting, reusable coupler for effecting high pressure, fluid-tight connection with bare or plain tube ends.

In the hydraulic, pneumatic, vacuum and other piping and fluid handling arts, a great variety of means have been employed for joining fittings, pipes, tubes and other conduit components. While means such as soldering, welding, leading, sweating and the like have been capable for the most part of providing relatively permanent fluid-tight connections between such components, even where high fluid pressures are encountered, the need has continued to grow for non-permanent connecting means to allow for changes and replacements in a particular piping or conduit system after it has been once constructed and while it is in use. It is not surprising that, while the more permanent installations have been capable of handling relatively high pressures, most of the features that have made a particular coupler interchangeable or replaceable have militated against its pressure carrying capacity and sealing capability. While there have been degrees of advancement in this area, it has in all cases been true that, where a coupling has been constructed to accommodate high pressures to a reasonably satisfactory degree, the means of such accommodation have complicated the structure to the point that its uncoupling has been difficult and time consuming. Conversely, those couplers which have been quickly and easily disconnectable have not been capable of affording fluid-tight connections for any length of time in high pressure systems, or else their reusability has been minimal because of the damage caused to one or more of their parts or to the conduit components upon coupling and uncoupling.

Most prior art couplers which have achieved a reasonable compromise between high pressure accommodation on the one hand and ease of connection and disconnection on the other have involved a variety of threaded fastening means for association with tube or pipe ends that have themselves been threaded or flared. Even these have been obviously unsatisfactory from the standpoint of complete mobility, however, because of the need for tools or machinery at the place where the interchanging of the fittings is to take place and becasue of the time involved in modifying the piping. At the same time, the threads on the tube ends or in the coupling components represent points of stress concentration where weaknesses and premature failures have been likely to occur upon the application of pressure. Moreover, the flaring or other machining of the tube ends, particularly away from the more controlled conditions of a factory, usually results in the presence of burrs or other surface irregularities which are likely to damage the relatively soft and deformable sealing materials used in such couplings. In still other examples of the more advanced prior art couplings, their operation has required a permanent deformation of either a part of the coupling or of the tube end being coupled with the result that the coupling is not reusable and a particular fitting cannot be repeatedly connected and disconnected without replacement of one or more components.

It is accordingly an object of this invention to provide an improved tube coupling assembly.

Another object of the invention is to provide a quick-acting, reusable tube coupling assembly which will effect a fluid-tight seal capable of withstanding prolonged exposure to liquids or gases under high pressure or high vacuum conditions.

Yet another object of the invention is to provide such a coupler which may be repeatedly installed and removed without the use of any tools or equipment.

Yet another object of the invention is to provide such a coupler which will not materially affect the tubing or piping with which it is associated so that the conduit components will not have to be replaced even after several connections have been made with them.

Still another object of the present invention is to provide a tube coupling assembly which can effect a fluid-tight seal with the end of a tube or a pipe just as it has been cut to a particular length without any need for threading, flaring or otherwise mechanically altering the tube or pipe end.

Still another object of the invention is the provision of such a coupler for use in pressurized systems which have automatic pressure release means which act before the coupler is disconnected to prevent its being blown off by any such pressure.

To achieve these and other objects and advantages which will appear from a reading of the following disclosure, the present invention teaches a hollow coupler body having axially slidable components therein providing a socket in which a bare or plain tube end may be inserted, mechanically locked and sealed by the actuation of single means for forcing the slidable components together. One of the slidable components, a collect, is caused to move radially inwardly to lock the tube end within the coupler; and another of the components, an annular sealing gasket, is forced radially inwardly to form a seal about the outer periphery of the tube end, all while the entire slidable arrangement of parts is forced into sealing engagement with an end thrust sealing ring or washer. Where the means for so moving the components within the coupler body comprise for example an eccentric bail and toggle linkage, the simple manipulation of the bail is all that is required to engage or disengage the tube end in its desired sealing relationship. Where, as is the case in the preferred embodiments of this invention, the gasket or other means for sealing about the outer periphery of the tube is located inwardly of the coupler body from the collet, the same tube end may be repeatedly inserted in and removed from the coupler without any damage to the sealing member such as might result from the imprint upon the tubing resulting from its engagement with the collet. Where one of the axially slidable components within the tubular body is a hollow cylindrical tube socket member in one end of which the tubing is inserted and the peripheral sealing gasket is made to seal against such socket end as well as against the outer circumference of the tube, complete sealing of the conduit comprising the tube end and the passage within the socket is achieved by the forced engagement of the opposite end of the socket member against an end thrust washer of deformable sealing material. Again the result of this assembly is that such burrs or other surface irregularities as may exist upon the tube end will not themselves directly contact the end sealing member to damage it in any way, even upon repeated couplings and uncouplings of the piping. Because the various sealing elements are thus protected from damage by the tube, the need for dressing, buffing or other costly procedures in machining and smoothing the tube end is eliminated.

In yet another modification of the invention, the forward portion; i.e., the portion deepest within the coupler body, of the tube socket member is provided with a helical spring seated against the forward end thereof against which the tube end abuts when it is inserted in the coupler and prior to the actuation of the axial compression means. The axial movement of the tube after it has been grasped by the collet will then cause the tube to press forward and compress the spring. While the spring accommodates this necessary axial movement of the tube upon actuation of the axial compression means on the one hand, it may also serve to keep a back force upon the tube to insure that the rest of the axially slidable components will be held under compression and that the deformable peripheral sealing gasket will continue to be urged into sealing engagement with the outer periphery of the tube, even when there is no pressure in the system. On the other hand, the arrangement of the parts within the coupler is such that the greater the pressure within the system, the greater will be the axial compression upon the peripheral sealing member and therefore the greater will be its sealing effect. This, coupled with the fact that the sealing takes place about the outer periphery of the tube where the greatest possible areas of contact between the sealed surfaces are available, results in the capability of the coupler of this invention to handle highly pressurized fluids including both liquids and gases without any loss thereof through the seals.

In a preferred embodiment of the invention, the coupler body comprises a rearwardly projecting hollow tubular extension within or partially within which are positioned the generally cylindrical tube socket member, the peripheral sealing gasket, a compression collar for urging the sealing gasket against an end of the socket member, a collet and a collet actuating member. All of these are of approximately the same inside diameter or lateral dimension so that, when they are coaxially aligned with the opening through the coupler body extension, they will be in end-to-end abutting relationship, and the urging of the endmost collet actuating member will cause all of the components to be moved forward and against each other. The force to cause such movement may be applied through the medium of a cap member the cover portion of which is an inwardly projecting flange defining an opening through which the tube may be inserted but nonetheless projecting inwardly to the point at which the cover will overlap and abut the end or some circumferential surface of the collet actuating member. The cap may then be actuated by an eccentric toggle assembly comprising a bail having inwardly projecting lugs which are eccentrically and pivotally mounted upon opposite sides of the tubular body which lugs engage a circular opening in a toggle link which in turn has an inwardly projecting lug engaging circular openings on opposite sides of the skirt of the cap.

The invention thus generally described may be more clearly understood by reference to the following detailed description of certain preferred embodiments thereof in connection with which reference may be had to the appended drawings wherein like reference characters refer to like parts; and FIGURE 1 is a cross sectional view of the coupler of this invention in association with a conventional fitting wherein the coupler is open to receive a tube end.

FIGURE 2 is a cross sectional view of the coupler and fitting illustrated in FIGURE 1 wherein a bare tube end is coupled in fluid-tight relationship with the fitting.

FIGURE 3 is an exploded view of the parts of the coupler illustrated in FIGURES 1 and 2.

Referring now to the drawings, the coupler designated generally by the number 10 is shown to be associated with a conventional valve or fitting 11 at its forward section 12 which includes a threaded opening 13 for engaging similar threads on the connecting portion of the fitting 11. To insure fluid-tight sealing between the coupler and the fitting thus associated with it, a suitable sealing gasket such as the O-ring 14 may be positioned at some point along the union of the two components. It will be observed that this threaded association is of a relatively permanent variety in that tools might be required to loosen or tighten the fitting within the coupler; but once the fitting is thus connected to the coupler, the entire assembly may be conveniently, quickly and repeatedly connected to or disconnected from fluid communication with a tube or pipe end via the coupler.

The coupler 10, in addition to the forward portion 12, has a rearwardly extending hollow cylindrical projection 15 at the forward end of which are positioned the metal washer 16 confining and holding within the coupler body the end thrust washer 17 composed of a rubber, synthetic rubber or other deformable, resilient and substantially incompressible material capable of forming the seal hereinafter described. Rearwardly of the thrust sealing assembly within the projecting body portion 15 are positioned in sequence the generally cylindrical tube socket member 18, the peripheral sealing gasket 19 in the form of an O-ring or a "quad-ring" composed of rubber, synthetic rubber or other resilient, deformable and substantially incompressible material, the compression collar 20, the collet 21 and the collet actuating collar 22. It will be observed that the inside diameter or other lateral inside dimensions of the components 18, 19, 20 and 22 are substantially equal so that, when they are positioned within the tubular extension 15, they will all be coaxially aligned and will be positioned for end-to-end abutting engagement. In the case of the components 18, 19 and 20 their axial alignment is insured by the fact that their outside dimensions are only nominally less than the inside diameter of the body portion 15 so that they will be axially slidable therein.

In this particular embodiment on the other hand, the coaxial alignment of the collet actuating member 22 results from the contact of its radially projecting circumferential lug 23 bearing against the inner wall of the cap 25 which is itself held in coaxial relationship to the assembly by its forwardly projecting cylindrical wall which is spaced from the body member by a suitably dimensioned collar 28. The cap member is also provided at its outward end with the interiorly projecting circumferential flange 26 which overlaps the circumferentially extending lug 23 of the collet actuating member and may in the case of the preferred embodiment illustrated, for example, be spaced therefrom by a spring washer 24 to insure firm, but resilient contact between the abutting components.

When the components thus far identified are thus assembled relative to the coupler body and its tubular extension 15, it can be seen that they define a generally cylindrical passage 37 into which a tube or pipe end 37a may be inserted. In the use of the coupling device, the tube end 37a is preferably inserted into the passage 37 to the point at which the very end of the tube bears against the helical spring 35 which is positioned at the forward end of the passage defined by the slidable components and is held there by the seat 36 of reduced diameter in the tube socket 18. As will be seen in FIGURE 2, the actuation of the eccentric toggle assembly to be hereinafter described, moves the cap axially forward relative to the body member, resulting in the abutment of the flange 26 of the cap 25 against the spring washer 24 which in turn abuts the projecting lug 23 of the collet actuating member 22 and causes the collet 21 to be axially compressed. This same movement forces the compression collar 20 against the peripheral sealing gasket 19 which, because it is in turn forced against the rear end of the tube socket 18, is compressed and extruded radially inwardly to form the peripheral seal about the outer circumference of the tube 37a, inserted within the coupler. At substantially the same time and in response to the same forward motion of the cap acting through the various components as above described, the tube socket 18 is itself urged forward so that its open end bears against and deforms the thrust sealing washer 17 to complete the seal of the conduit passage between the open tube end and the fitting 11 associated with the coupler.

As best shown in FIGURE 3, the collet 21 is in the form of a conical ring, the outside diameter of which is substantially equal to the inside diameter of the collet housing portion 23a of the collet actuating member and the inside diameter of which is substantially the same as the inside diameter of the passage 37. Projecting radially inwardly from this ring are a plurality of circumferentially spaced teeth or bits 40, the inwardly disposed flat surfaces 41 of which are of relatively small surface area as a result of which they are capable of applying relatively high unit pressures when they are caused to bear against the outer surface of a pipe or tube and particularly of a tube of a relatively soft metal such as copper. The collet itself is composed of a durable, elastic and resilient material such as spring steel; and the inwardly projecting teeth 40 are angularly disposed to the plane of the ring 21 so that, as the annular front edge of the collet actuating unit 22 compresses against the collet which is in turn wedged against the compression collar 20, the teeth 40 are forced toward the plane of the ring 21 as a result of which their apparent inward penetration will be increased, thereby reducing the diameter of the opening defined by their inwardly disposed surfaces 41 as compared with such opening when the teeth are in normal position. This movement causes the teeth to be urged against and in many cases to become nominally embedded in the exterior surface of the tube end 37a positioned within the channel 37. Because this nominal movement of the teeth of the collet in response to the compressive force being simultaneously applied to all of the components results in some axial movement of the tubing itself, not only within the coupler body generally but also within the axially slidable components, especially the tube socket 18, this latter is preferably supplied with the forward seating lug or rim 36 against which the helical spring 35 rests and may be compressed under the axial movement of the tubing. The helical spring thus serves as a seating and locating device for the insertion of the tube end before the coupler is closed and locked, and it also acts to keep a reverse pressure on the tube end after the coupler has become closed whether or not there is pressure in the system being served by the coupler. Because of this, the desired compression between the tube socket, collar, collet actuating member, collet and peripheral sealing gasket will be maintained and will tend to preserve the seal of the tube even after the locking mechanism is released. This helps to prevent a "blowoff" of the coupled tube end where the coupler is released with pressure in the system.

To cause the desired forward movement of the cap 25 and the abutment of its flange 26 against the aligned sequence of the axially slidable components within the coupler body extension 15 and to hold the cap and said components in the desired state of compression whereby they will coact to mechanically lock and hydraulically or hermetically seal the tube end positioned therein, the illustrated embodiment of the invention employs an eccentric toggle link assembly which can be understood by a comparison of the exploded components in FIGURE 3 and the assembly shown in FIGURES 1 and 2. Associated with the cylinder or skirt portion 26a of the cap 25 through diametrically opposed openings 29a by a rivet or like fastener having the inwardly projecting cylindrical lug 29 are the toggle links 31 on opposite sides of the cylindrical coupler body. As best shown in FIGURE 3 these toggle links also comprise a circular opening 33a spaced from the projecting lugs 29 and dimensioned to receive the cylindrical lugs or cams 33 which project inwardly from the sides of the bail member 32. The eccentrically positioned openings 44 through the lugs 33 allow the bail and the toggle links 31 to be fastened to the forward portion of the coupler body by threaded fastening members such as the screws 45 which pass loosely through the openings 44 but threadably engage the opening 46 in the body member so that the lugs 33 become cams for moving the cap 25. The balance of the bail comprises the coupler body-encircling strap 43 which terminates in outwardly flared tabs 42, all providing for greater ease of manual manipulation.

A comparison of the eccentric toggle assembly thus illustrated and described with the arrangement of the parts in FIGURES 1 and 2 will show that, when the toggle bail is manipulated by rotation through at least 90 degrees from its body-encircling position, the cams 33 will cause the toggle links to move rearwardly and, because of their engagement with the cap via the lugs 29 engaging the openings 29a, will cause the cap to move rearwardly thereby releasing the pressure against the slidable components 18, 19, 20 and 22 within the coupler body and allowing them to move freely. With the coupler in this open position, it will be observed that the axial components within the coupler body provide an uninterrupted cylindrical passage 37 starting at the rearward edge of the collet actuating member extension 27 through the cap and continuing up to the forward end of the tube socket member 18 or at least to the helical spring 35 seated at the forward end of the socket member. In operation, a tube is brought into this conduit until its end bears against the helical spring as illustrated in FIGURE 2 whereupon the bail member of the toggle assembly is rotated through 90 degrees to achieve the position wherein the strap 43 is adjacent the tubular body. During this rotation, the coaction of the cam 33 will move the toggle links 31 and the cap 25 toward the front or thrust washer end of the coupler whereby the peripheral sealing gasket 19 will be forced radially inwardly to embrace and seal the outside circumference of the tube, the collet teeth will distend radially inwardly to grasp and/or bite into the tube, and the tube socket with the tube firmly held and peripherally sealed therein will be urged against the thrust sealing washer 17 to complete the fluid tight seal.

Once the components within the coupler body extension 15 are placed under compression and effect a seal and locking engagement with a tube end positioned therein, the nature of the arrangement of the parts is such that, not only will the sealing force increase as the pressure within the system increases, but also the components will remain under a state of axial compression at least so far as the peripheral sealing gasket 19 and the tube holding collet are concerned so long as the tube end is exposed to pressure in the system. When the toggle assembly is released however, the lugs 29 move rearwardly to about against the shoulder 18a projecting radially from the outer surface of the socket 18 and thereby to cause the socket 18 to be forced away from its end-sealing relationship with the thrust washer 17. As this occurs, any pressure within the system is immediately and automatically released through the circumferentially spaced and aligned vent holes 47 through the wall of the coupler body. Since the pressure within the system is thus vented or released while the tube end remains held within the coupler, the danger and annoyance associated with the "blowoff" of the coupler upon its removal from a pressurized system characteristic of the prior art are, by the device of this invention, eliminated. As the tube end is removed from the coupler, it will be observed that the portion thereof that was contacted by the collet 21 and might be thereby roughened or burred does not come into contact with any of the sealing elements, particularly the peripheral sealing element 19 to cause any damage to the same. This fact, together with the fact that the collet is of such dimensions and resilient material that it will return to its original position and may be repeatedly stressed to bring its teeth into tube gripping position, makes possible the repetition through many cycles of insertions and removals of the same tube end in the same quick-disconnect coupler.

While the invention has been described in considerable detail in connection with certain specific embodiments thereof, it is to be understood that the foregoing particularization has been for the purpose of illustration only and does not limit the scope of the invention as it is defined in the subjoined claims.

I claim:

1. A quick-acting, reusable tube coupling for effecting a high-pressure, fluid-tight connection with at least one plain tube end comprising a hollow coupler body member, a hollow tube socket member positioned within and axially slidable relative to said body member, a compression collar positioned within and axially slidable relative to said body member, said collar being of substantially the same lateral dimensions as said socket member and being axially spaced therefrom by a deformable peripheral sealing member positioned within said body member and between one end of said socket member and one end of said collar, a deformable thrust sealing unit mounted in the coupler body and positioned for abutting engagement with one end of said socket member opposite that adjoining said peripheral sealing member, a tube-gripping collet positioned near the end of said collar opposite the end thereof adjoining said peripheral sealing member, a collet-actuating sleeve in abutting engagement with the face of said collet opposite said collar and being slidable relative to said body member, and means for forcing said collet-actuating sleeve toward said collet and for forcing said collet, said collar, said peripheral sealing member and said socket member toward said thrust sealing unit whereby the actuation of said means will substantially simultaneously cause the axial movement of said socket member into abutting, fluid-sealing relationship with said thrust sealing unit, the compression and radially inward displacement of said peripheral sealing member and the radially inward movement of said collet as a result of which the plain end of the tube positioned within said socket will be mechanically gripped and fixedly held in said coupler by said collet, the outer periphery of said tube end will be sealed by the uniform contact therewith of said peripheral sealing member, and the portion of the tube end extending interiorly of the peripheral sealing member will be sealed relative to the coupler body member by the forced abutting engagement between the thrust sealing unit and the end of the socket member adjacent thereto.

2. A tube coupling according to claim 1 wherein a helical spring is seated against the forward end of said socket member and projects rearwardly within the interior thereof whereby the rear end of said spring will abut a tube end inserted in said socket, will accommodate the axial movement of said tube end relative to said body member and said socket and will exert a rearwardly acting force against said tube end while it is held within said coupling assembly.

3. A tube coupling according to claim 1 wherein said collet member is in the form of a ring having circumferentially spaced teeth projecting radially inwardly therefrom.

4. A tube coupling according to claim 3 wherein the inwardly disposed surfaces of said teeth are flat and of relatively small surface area whereby they will bite into the periphery of a tube end positioned within said assembly.

5. A tube coupling according to claim 1 wherein the wall of said coupler body has at least one vent opening therethrough at a point between said thrust sealing unit and said peripheral sealing member and said forcing means, upon their reversal, will act to force said socket member away from said thrust sealing unit whereby any pressure within the system will be released through said vent opening and will not blow off the coupler.

References Cited

UNITED STATES PATENTS

| | | | |
|---|---|---|---|
| 2,448,888 | 9/1948 | Hynes | 285—382.7 X |
| 2,727,761 | 12/1955 | Elliott et al. | 285—14 X |
| 2,747,899 | 5/1956 | Wiltse | 285—351 X |
| 2,805,873 | 9/1957 | Brennan et al. | 285—340 X |
| 2,954,742 | 10/1960 | Williams | 285—133 X |
| 2,999,701 | 9/1961 | Blair et al. | 285—340 |
| 3,079,179 | 2/1963 | Niemoth | 285—133 |
| 3,300,235 | 1/1967 | Blackwell | 285—312 |

CARL W. TOMLIN, *Primary Examiner.*

D. W. AROLA, *Assistant Examiner.*

U.S. Cl. X.R.

285—175, 312, 340, 348; 279—1